(12) United States Patent
McGrath et al.

(10) Patent No.: US 7,020,261 B2
(45) Date of Patent: *Mar. 28, 2006

(54) METHOD FOR PROVIDING ENHANCED DIRECTORY ASSISTANCE UPON COMMAND USING OUT-OF-BAND SIGNALING

(75) Inventors: Adam J. McGrath, Durham, OR (US); Nicholas J. Elsey, West Linn, OR (US); A. Peter Powell, Colton, OR (US); Paul W. Filliger, Keizer, OR (US); Michael A. Kepler, Aloha, OR (US); Timothy A. Timmins, Tigard, OR (US); Patrick M. Cox, Tigard, OR (US)

(73) Assignee: Metro One Telecommunications, Inc., Beaveron ( * ) Notice: Subject to any disclaimer, the term of this patent is extended or adjusted under 35 U.S.C. 154(b) by 0 days.

This patent is subject to a terminal disclaimer.

(21) Appl. No.: 10/430,051

(22) Filed: May 6, 2003

(65) Prior Publication Data

US 2003/0194075 A1 Oct. 16, 2003

Related U.S. Application Data

(63) Continuation of application No. 09/417,523, filed on Oct. 13, 1999, now Pat. No. 6,628,772, which is a continuation-in-part of application No. 09/135,155, filed on Aug. 17, 1998, now Pat. No. 6,035,190, which is a continuation of application No. 08/552,222, filed on Nov. 2, 1995, now Pat. No. 5,797,092, which is a continuation-in-part of application No. 08/498,900, filed on Jul. 6, 1995, now abandoned, which is a continuation-in-part of application No. 08/234,644, filed on Apr. 28, 1994, now abandoned.

(51) Int. Cl.
*H04M 15/00* (2006.01)

(52) U.S. Cl. .................... 379/218.01; 379/209.01; 379/212.01; 379/203.01
(58) Field of Classification Search .......... 379/218.01, 379/209.01, 212.01, 67, 218.02, 203.01; 455/404
See application file for complete search history.

(56) References Cited

U.S. PATENT DOCUMENTS

| 837,894 A | 12/1906 | Aven |
| 1,589,444 A | 6/1926 | Thurston et al. |
| 1,714,303 A | 5/1929 | Friendly |

(Continued)

OTHER PUBLICATIONS

Bell Atlantic, "White Pages Northern Virginia", p. 37, Jan. 1995.
IBM Technical Disclosure, "Method and Apparatus for Automatic Contextual Call Return, Calendaring, and Address Book Search", vol. 37, No. 04A, Apr. 1994.
IBM Technical Disclosure, "Mechanism to Automate Updating Obsolete Telephone Numbers", vol. 37, No. 04A, Apr. 1995.
America Online, "Global Positioning Satellite (GPS) Technology and the Cellular Phone Network", Apr. 1995.

(Continued)

*Primary Examiner*—William J. Deane, Jr.
(74) *Attorney, Agent, or Firm*—Kaye Scholer LLP

(57) ABSTRACT

A user calls a directory assistance service provider to search for a desired telephone number and be connected to a party at the desired number. In one such connection, the user is afforded enhanced directory assistance upon a user command in the form of an out-of-band signaling message, e.g., SS7 signaling message. For example, the user may be afforded further operator assistance by pressing on the user telephone a predetermined key (e.g., "*" key), which is detectable by the directory assistance service provider as an SS7 signaling message.

48 Claims, 8 Drawing Sheets

U.S. PATENT DOCUMENTS

| | | |
|---|---|---|
| 4,696,028 A | 9/1987 | Morganstein et al. |
| 4,908,825 A | 3/1990 | Vea |
| 4,908,850 A | 3/1990 | Masson et al. |
| 4,910,493 A | 3/1990 | Chambers et al. |
| 4,918,719 A * | 4/1990 | Daudelin ................ 379/88.01 |
| 4,932,042 A | 6/1990 | Baral et al. |
| 5,056,134 A | 10/1991 | Bauer et al. |
| 5,099,508 A | 3/1992 | Inaba |
| 5,163,083 A | 11/1992 | Dowden et al. |
| 5,187,740 A | 2/1993 | Swaim et al. |
| 5,222,120 A | 6/1993 | McLeod et al. |
| 5,334,974 A | 8/1994 | Simms et al. |
| 5,339,352 A | 8/1994 | Armstrong et al. |
| 5,414,754 A | 5/1995 | Pugh et al. |
| 5,432,840 A | 7/1995 | Ryden |
| 5,479,482 A | 12/1995 | Grimes |
| 5,511,111 A | 4/1996 | Serbetcioglu et al. |
| 5,563,931 A | 10/1996 | Bishop et al. |
| 5,590,187 A | 12/1996 | Greenspan |
| 5,646,987 A | 7/1997 | Gerber et al. |
| 5,835,570 A | 11/1998 | Wattenbarger |
| 6,330,308 B1 | 12/2001 | Cheston, III et al. |
| 6,628,772 B1 * | 9/2003 | Cox et al. ............. 379/218.01 |

OTHER PUBLICATIONS

America Online, "GPS at the Fingertips of Car Owners", Apr. 1995.

America Online, "Combines the Cellular Network with Global Positioning", Apr. 1995.

* cited by examiner

PRIOR ART    SS7 SIGNALING POINTS

PRIOR ART    SS7 SIGNALING LINK TYPES

PRIOR ART    BASIC ISUP SIGNALING

METHOD FOR PROVIDING ENHANCED DIRECTORY ASSISTANCE UPON COMMAND USING OUT-OF-BAND SIGNALING

RELATED APPLICATION DATA

The present application is a continuation of application Ser. No. 09/417,523, filed Oct. 13, 1999, now U.S. Pat. No. 6,628,772 which is a continuation-in-part of application Ser. No. 09/135,155, filed Aug. 17, 1998, now U.S. Pat. No. 6,035,190, which is a continuation of application Ser. No. 08/552,222, filed Nov. 2, 1995, now U.S. Pat. No. 5,797,092, which is a continuation-in-part of application Ser. No. 08/498,900, filed Jul. 6, 1995, now abandoned, which is a continuation-in-part of application Ser. No. 08/234,644, filed Apr. 28, 1994, now abandoned.

FIELD OF THE INVENTION

The present invention relates to systems for providing directory assistance services, and more particularly relates to the provision of directory assistance services in a network using out-of-band signaling.

BACKGROUND AND SUMMARY OF THE INVENTION

Telephone directory assistance services have been available for the past century. While improvements have been made over the decades, such systems are still poorly suited for use by subscribers of wireless telephone services.

In prior art directory assistance services, a customer dials an operator and identifies the name and address of a party whose telephone number is desired. The operator then locates the number using printed directories or a computer database, and provides the number to the customer. (The provision of the number is sometimes done by the live operator, but more typically is done with a computerized voice response unit that provides connection to the operator is terminated.

While satisfactory for most customers, this arrangement is ill-suited for many wireless telephone customers. For one, such customers are usually away from their general work environments (e.g. in a vehicle), and thus may not have ready access to a pencil and paper in order to make a note of the desired number. (Even if such materials are available, the customer may not find it convenient to interrupt other activities, e.g. driving, in order to make a note.) In addition, the process of initiating a second call—to the desired party—entails further manual operations (e.g. hanging up, waiting for another dial tone, and dialing) which may be a hindrance to the customer's other activities.

The present assignee, in the prior art, has redressed certain of these difficulties by providing a directory assistance service that eliminates the need to make a note of the desired number, or undertake a redialing exercise. Instead, after determining the telephone number desired by the customer, rather than voicing it to the customer, the directory assistance operator goes ahead and initiates a call to the desired party, and connects the new outgoing call to the original customer. (The operator may stay on the line as a conferenced party so as to provide further assistance, or may withdraw from the connection, depending on the particular implementation.) This arrangement obviates the need for the customer to make a note of the voiced number, or to undertake a redialing exercise. However, if the initiated call is not completed (e.g. a "busy" tone is received), or if the customer desires further directory assistance, then the customer must again call the directory assistance operator for help.

The problems associated with providing directory assistance services to wireless customers are not limited to hardships on the customers; the directory assistance service and the wireless carrier also confront unique issues. In the assignee's prior art system, for example, the wireless carrier (which is typically responsible for billing of the customer) knows only that the customer has dialed the directory assistance operator, but does not know the number to which the customer is ultimately connected by the operator. Billing is thereby complicated. In the prior art system, the toll charges (assuming toll calls are permitted; often they are not) for the connection between the customer and the desired number are simply absorbed by the directory assistance service, and recouped by billing the wireless carrier a sufficiently large flat rate charge for each directory assistance call so as to cover these costs. The wireless carrier then bills the subscriber a fixed amount for each directory assistance inquiry, regardless of the toll charges of any further connection established for the customer by the directory assistance operator. This arrangement, however, has a number of disadvantages. In addition to increased cost, it also fails to provide the wireless carrier useful information about its customers' calling patterns, which may affect decisions relating to system expansion, etc.

The directory assistance method disclosed herein overcomes these problems of the prior art. For example, in one embodiment of the present invention, a customer who wishes directory assistance services is connected in the conventional manner to an operator who determines the destination telephone number desired by the customer. As in the prior art, the operator then initiates a call connecting the customer to the destination telephone number. However, rather than dropping all further involvement with the call, this embodiment is capable of detecting a command to reconnect to an operator issued by the customer, such as that obtained by pressing the "*" button or some other button. If such a signal is detected, the customer is transferred to a directory assistance operator, who can then provide whatever further assistance is needed (e.g. redialing a busy number, or providing further directory assistance). By this arrangement, the press of a single button by the customer summons further directory assistance, rather than the redialing procedure required by the prior art.

To achieve this type of customer-driven functionality, the present invention is responsive to commands issued by the customer, for example by pressing a key on the telephone. The commands can be detected at the directory assistance switch by a DTMF receiver, or alternatively, may appear at the directory assistance service center as out-of-band signals on an associated signaling channel, independent of the actual voice channel.

Out-of-band signaling, as is well-known in the art, involves separating the voice and signaling components of a call into two separate components. The signaling information is transmitted on a signaling data link, and the voice and data traffic components are transmitted over a voice trunk. A signaling data link is a two-directional transmission path (a typical carrier channel) for signaling, comprising transmit and receive data channels operating together in opposite directions at the same data rate. The signaling information typically contains connection-oriented signaling such as address information for call setup, supervision/call control signaling, tear down, information needed for distributed application processing and network management information.

Signaling data is typically transmitted in packets between network nodes in what is known as a Common Channel Signaling ("CCS") system. One example of a standardized, general-purpose protocol for a CCS system is Signaling System 7, or "SS7." SS7 is an open-architecture protocol that handles current communication requirements and accommodates future expansion of new applications. It is optimized for operation in a digital telecommunications network in conjunction with stored program control switches. SS7 meets present and future requirements for information transfer (circuit and non-circuit related) for interprocessor transactions within telecommunication networks for call control, network database access, and management and maintenance signaling. Furthermore, SS7 provides a reliable means of information transfer, correctly sequenced, without loss or duplication.

The SS7 standard for telecommunications is global, defined by the International Telecommunication Union (ITU) Telecommunication Standardization Sector (ITU-T). The standard defines the procedures and protocol by which network elements in the public switched telephone network (PSTN) exchange information over a digital signaling network. The ITU definition of SS7 is designed to allow for national variants, such as the American National Standard Institute (ANSI) and Bell Communications Research (Bellcore) standards used in North America, and the European Telecommunications Standards Institute (ETSI) standard used in Europe. The naming conventions have been defined as follows: CCITT SS#7 indicates International Signaling system 7, and SS7 indicates the U.S. version of Signaling System 7. SS7 has been appropriately modified for use with and between U.S. networks. SS7 is intended to be generally compatible with CCITT SS#7.

SS7 transport has become the primary mode for signaling and information transfer in today's wireless and wireline networks. Information elements like calling party number, routing information related to 800 numbers, and current location information for roaming wireless subscriber are all carried over SS7 signaling networks. SS7 makes features such as call waiting, three-way calling and caller ID possible. The benefits of the SS7 protocol include more efficient call processing, AIN products and services (Advanced Intelligent Network: service-independent capabilities used in SS7 to support advanced features), better reliability, faster call processing, faster call set up and tear down, and more accurate signaling detection. With SS7, regular voice lines are not tied up until the call is actually established or the destination number has been identified as available (through the signaling data link)—about 40% of all calls made are not completed because of either a busy signal or no answer.

SS7 call processing provides great flexibility in receiving and/or responding to customer-issued commands. For example, in one embodiment of the present invention a customer can issue a command for conferencing by pushing a key on the customer's phone (e.g. the "*" key), which is detected at the directory assistance service center as an SS7 message. Then, either a directory assistance operator or an automated system determines the telephone number of an additional party the customer wishes to conference in, and a telephonic connection between the additional party and the existing connection is initiated using SS7 call processing. The operator or automated system can continue to add additional parties or delete parties as desired by the customer using SS7 call processing, or the customer can reinitiate the procedure at a later time to further change the participating parties.

Alternatively, the command for conferencing by the customer could be detected by a DTMF tone receiver on the voice channel, while call initiation and processing occurs through SS7 signaling.

In another embodiment of the present invention, the directory assistance center, in attempting to initiate a telephonic connection between the customer and the customer's desired customer, takes certain actions upon detection of a SS7 signaling message indicting connection problems (such as ring-no-answer or call could not be completed). The actions include either directly reconnecting the customer, or offering the customer a variety of automated menu options, including returning to an operator.

In yet another embodiment, upon receiving a call from a customer at the directory assistance service, a preferred service associated with that customer is determined from a customer attribute database, or in the event the customer does not have an associated preferred service, a default service chosen. Upon detection of a SS7 signaling message or DTMF tone indicating the customer has issued a command for the preferred service, the directory assistance service center actuates the preferred service using SS7 call processing, whether it be reconnecting to an operator, conferencing in other parties, or any other of a variety of enhanced directory assistance features.

The directory assistance system disclosed herein further addresses the billing difficulties associated with completion of customer calls by directory assistance operators. In one embodiment of the invention, the directory assistance service logs, in a billing database, information identifying the customer (i.e. the customer identification number accompanying the call from the wireless provider), the destination number to which the customer is connected, and the date, time and duration of the customer/destination number connection. This log of information is periodically provided to the wireless carrier, allowing it to bill the customer for the call connected by the directory assistance operator and recoup the associated expense. This permits the flat rate charged by the directory assistance provider to be reduced correspondingly, and provides the wireless service with more detailed information about its customers' usage requirements.

The foregoing and additional features and advantages of the present invention will be more readily apparent from the following detailed description, which proceeds with reference to the accompanying drawings.

DETAILED DESCRIPTION

Figure 1A:
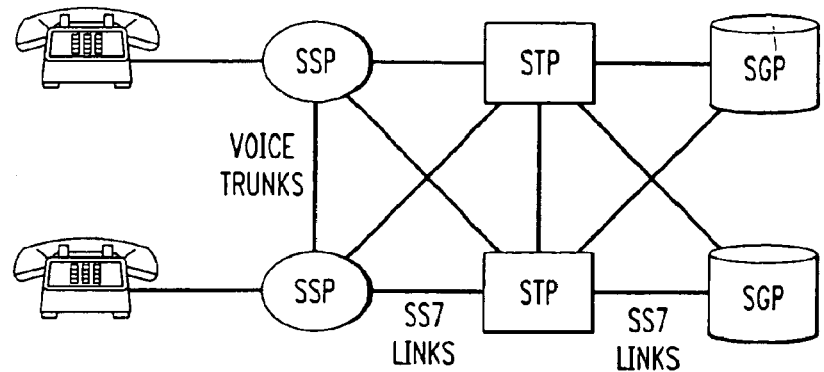
FIGS. 1a–b are block diagrams depicting a prior art SS7 network.

The present invention contemplates a directory assistance center operating in conjunction with a SS7 network. Turning to FIG. 1a, a SS7 network by functional component is shown. A SS7 network is composed of a plurality of service switch points (SSP), signal transfer points (STP) and signal control points (SCP). An SSP is generally a telecommunications switch, access tandem or end office which can interact with the SS7 network for data base services. For purposes of the present invention, the SS7 network node of the directory assistance center disclosed herein operates as an SSP.

SSPs send signaling messages to other SSPs to setup, manage, and release voice circuits required to complete a call. An SSP may also send a query message to an SCP, which is a centralized database typically containing a routing table, to determine how to route a call. Network traffic between SSPs is typically routed via a STP (a packet switch or router). An STP routes each incoming message to an outgoing signaling link, such as an SSP or another STP, based on routing information contained in the SS7 message. STPs eliminate the need for direct links between signaling points.

Figure 1B:
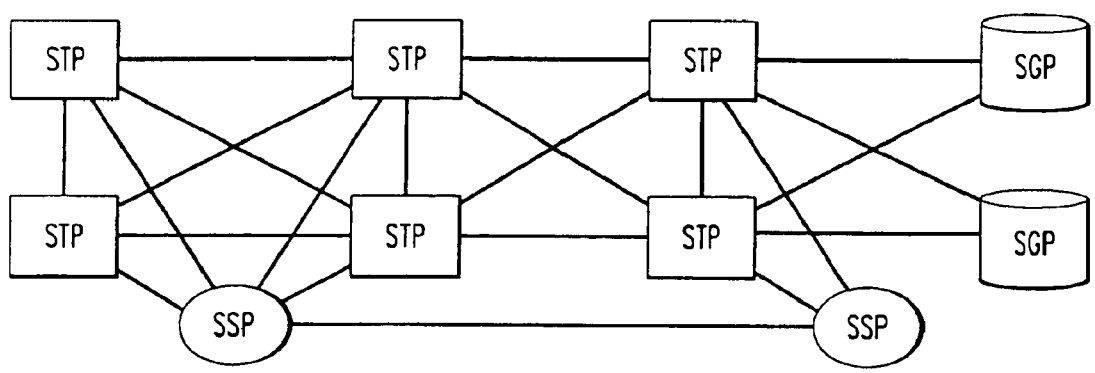

As shown in FIG. 1b, SCPs and STPs are usually deployed in mated pair configurations, in separate physical locations to ensure network-wide service in the event of an isolated failure. Also, SS7 signaling data links (which connect the SSPs, STPs and SCPs) typically come in pairs for redundancy. Traffic is load shared between the link pairs. The link pairs are installed as physically distinct paths throughout their complete routes (i.e. they are diverse), generally placed on different interexchange carriers. This configuration ensures that a problem on one facility will not interfere with the normal traffic flow. The redundancy and diversity incorporated into a SS7 network reflects the SS7 signaling network's importance in call processing.

Physically, both SS7 signaling data and voice traffic are commonly transmitted on a DS1 or T1/E1/J1 carrier. While a T1/E1/J1 carrier has 24 or 30 individual channels of 64 kb/s lines, a SS7 circuit is designed to operate at 56 kb/s, utilizing the other 8 kb/s for clocking and error checking.

Figure 2:
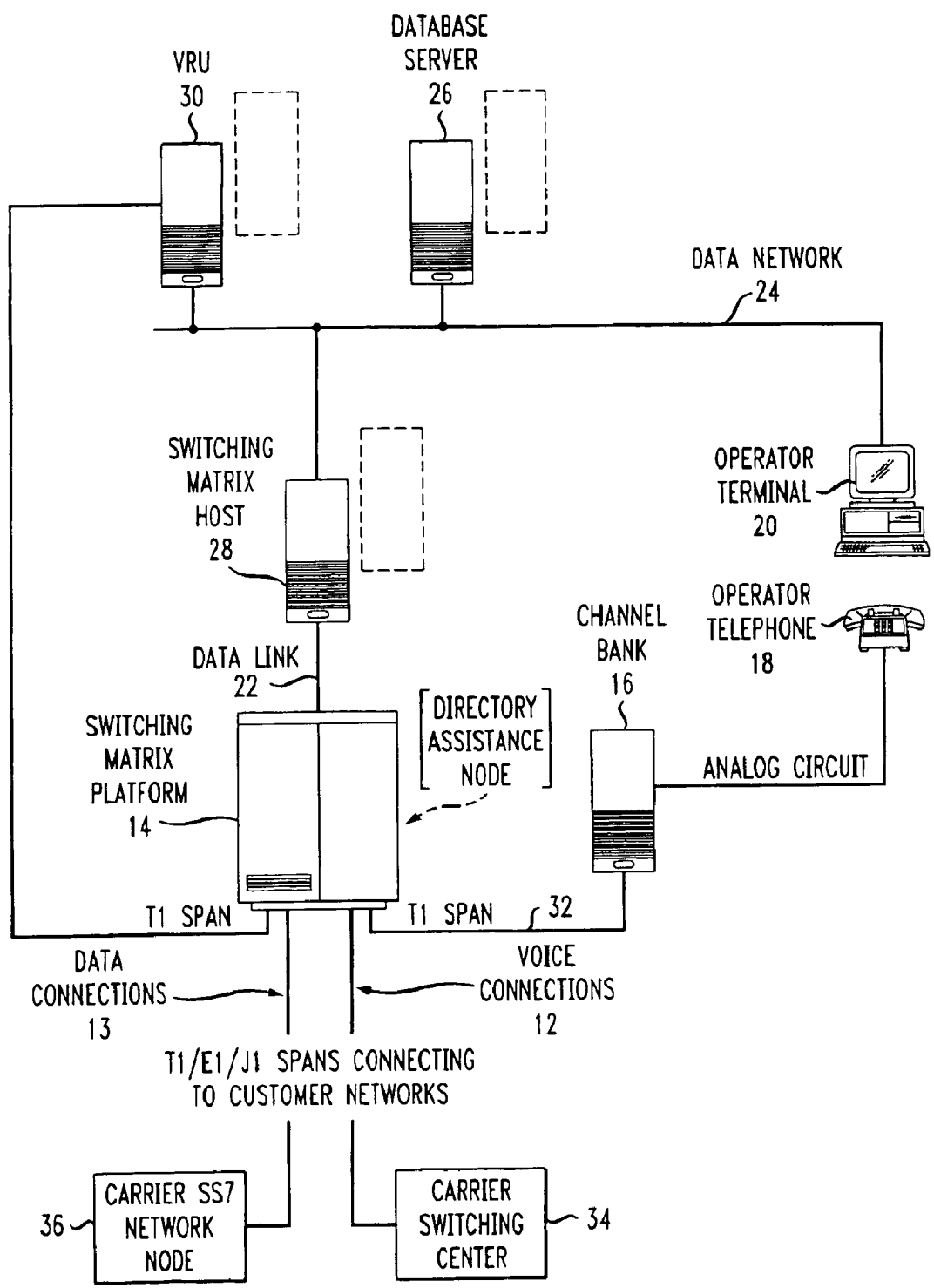
FIG. 2 depicts the components of a directory assistance center according to the invention.

With reference to FIG. 2, a directory assistance center 10 according to one embodiment of the present invention includes a switching matrix platform 14, also referred to as a private branch exchange (PBX) or switch, connected to one or more external T1/E1/J1 voice connections 12 and one or more corresponding T1/E1/J1 data connections 13 from customer networks. While pictured as physically separate channels, data connections 13 may comprise a physical channel within voice connections 12, such as a DS0 channel within a TI line. Switching matrix platform 14 is also connected via T1 communication links to a voice response unit (VRU) 30, and to a channel bank 16 for coupling to a plurality of operator telephones 18. Each operator is further equipped with a terminal 20 that includes a video display unit and a QWERTY keyboard with associated dialing pad. The operator terminals are coupled over a data network 24 to a database server 26, allowing an operator to access the data in database server 26 through the operator terminal 20. In one embodiment, data network 24 is a Local Area Network (LAN).

In addition to the operator terminals, data network 24 further connects to a voice response unit (VRU) 30 and a switching matrix host computer 28 (also referred to as a PBX host), which in turn is connected to switching matrix platform 14 by switch data link 22. In one embodiment, VRU 30, database server 26, and switching matrix host 28 have redundant systems (as shown), which can operate as either back-up systems in the event of primary system failure, or provide load-sharing in a master-slave relationship with the primary system.

Voice connections 12, also referred to as voice links, provide connection between the directory assistance center's switching matrix platform 14 and carrier switching center 34, through which incoming directory assistance calls are received. Voice connections 12 further provide connection to the network over which outgoing calls are placed (which network may be different than that used for incoming traffic). Similarly, data connections 13, also referred to as data links, provide a signaling connection between the directory assistance center's node and the carrier's SS7 network node 36. In the event an outgoing call is placed on a different network than the calling customer's carrier's network, voice connections 12 and data connections 13 will also provide connection to the outgoing network's switch and node, respectively.

In one embodiment of the present invention, the directory assistance node in is contained within switching matrix platform 14, but one of skill in the art will appreciate that the directory assistance node could also be a physically distinct component.

In terms of SS7 network functional components (see FIG. 1b), the directory assistance node operates as a SSP. The carrier's SS7 network node 36 may either be a SSP if the carrier is directly linked to the directory assistance center, or it may be a STP whereby calls from the carrier's SSP are routed through the carrier's SS7 network node/STP (or multiple STPs) to the directory assistance center. Alternatively, SS7 signaling for the carrier may be transmitted through an independent SS7 network provider, in which instance data connections 13 would connect to the STP of a SS7 network provider independent from either the incoming or outgoing carrier's network. Neither an independent SS7 network provider nor an independent outgoing network are shown in FIG. 2.

Operation of switching matrix platform 14 is governed by computer-readable instructions stored and executed on switch matrix host computer 28. In one embodiment of the invention, switching matrix platform 14 is an Excel LNX 2000 and switch data link 22 is a 38.4 kb serial link; in another embodiment, switch data link 22 is an Ethernet link.

Switching matrix platform 14 is described in further detail with reference to FIG. 3. Switching matrix platform 14 includes expandable central processing unit ("EXCPU") 304 and/or matrix central processing unit ("MXCPU") 304. EXCPU/MXCPU 304 serves as an interface between switching matrix platform 14 and switching matrix host computer 28 (via switch data link 22).

Switching matrix platform 14 also includes SS7 processing components, namely SS7 I/O cards 340, each of which can concurrently support up to 16 links. In one embodiment, the switching matrix platform has two SS7 I/O cards, although in an EXS 2000 switching matrix platform up to eight SS7 I/O cards (128 concurrent links) can be supported. A further redundant pair of SS7 I/O cards (not shown) provides back-up. SS7 I/O cards 340 work in conjunction with SS7 computer instructions stored on switching matrix host 28 for SS7 call processing such as customer-issued commands for service, call setup, control signaling and tear down, etc. With respect to the SS7 network described at FIGS. 1a and 1b and discussed above, the switching matrix platform acts as a service switching point (SSP), also referred to as the directory assistance node.

EXCPU/MXCPU 304, SS7 I/O cards 340 and other components of switching matrix platform 14 communicate through shared communication path 302, commonly called a "midplane." In the currently-described embodiment, midplane 302 utilizes a time division multiplexing ("TDM") method of sharing a common pathway. Thus, a plurality of data and/or voice streams can be interlaced onto the single path, separated by time.

Another board-level component of switching matrix platform 14 is multi-frequency digital signal processor ("MFDSP") unit 310, which includes four single in-line memory module ("SIMM") packagings. Each SIMM packaging is comprised of four DSP arrays. Each DSP array is composed of multiple, illustratively sixteen, programmable DSPs. The DSPs can be programmed or reprogrammed to function as, among other things, call progress analyzers ("CPA"), call progress generators ("CPG"), multi-frequency ("MF") receivers or transmitters, dual-tone multi-frequency ("DTMF") receivers or transmitters, or conference units, depending upon the demand placed on directory assistance center 10 and switching matrix platform 14 for each corresponding function.

CPAs (represented by the numeral 318 in FIG. 3) are sensitive to, and capable of identifying, telephone connection status conditions and signals including ring tone, busy, all-circuits-busy, tri-tone, reorder, PBX intercept, SIT intercept, vacant code, reorder LEC, no circuit LEC, reorder carrier, no circuit carrier, continuous on tone, and silence. In an exemplary embodiment of the invention, one CPA will monitor only one outbound channel at a time. In other embodiments of the invention, one CPA may be applied to more than one outbound channel. However, to ensure that connection status conditions are properly detected, the number of outbound channels monitored by one CPA should be kept to a minimum (i.e., no more than four). In still other embodiments of the invention, two or more DSPs may be applied to a single outbound channel.

CPGs (represented by the numeral 312 in FIG. 3) generate tones to customers connected to directory assistance center 10, such as the ringback tone customers hear when they are routed to an operator.

DTMF receivers (represented by the numeral 314 in FIG. 3) listen for DTMF tones generated by a customer's telephone, such as when a customer presses a telephone button. DTMF receivers are capable of detecting and identifying which button was pressed (i.e., the numbers 0–9 or the characters '*' or '#') and passing that information to switching matrix host 28 for appropriate action. DTMF receivers are assigned to monitor inbound channels for a configurable period of time, illustratively, from the time of a caller's initial connection to switching matrix platform 14 to the time the caller hangs up, including the duration of all outbound calls made on the caller's behalf. Once applied to an inbound channel, a DTMF receiver will allow switching matrix platform 14 to detect whenever the caller presses a telephone button, perhaps in order to activate a return transfer as described further herein, or another feature of directory assistance center 10.

Conference units (represented by the numeral 316 in FIG. 3) enable switching matrix platform 14 to connect two or more voice paths in a balanced manner, thereby providing the necessary voice connections between calling parties, called parties, and directory assistance providers.

In the presently-described embodiment, each DSP array provides multiple instances of the function for which it is programmed, the exact number depending upon the specific function. For example, each DSP array programmed to provide CPA, CPG, or DTMF receiver functions provides sixteen instances of the chosen function. In other words, a DSP array programmed to provide call progress analyzer functions will contain sixteen separately and independently functional and controllable CPAs. A DSP array programmed to provide conference unit functions, however, provides only four instances of such function. The programmable DSPs on MFDSP unit 310 are managed by switching matrix host 28, via EXCPU/MXCPU 304, which keeps track of which DSPs are available and which are allocated.

An additional board-level component of switching matrix platform 14 is T1/E1/J1 interface unit 330. Switching matrix platform 14 contains one or more T1/E1/J1 interface units; each unit provides connections to multiple T1/E1/J1 (1.544 mb/sec) spans, each of which is comprised of 24 or 30 channels, thus providing at least 192 64 kb voice/data and/or SS7 signaling channels per T1/E1/J1 interface unit. The T1/E1/J1 interface units connect to T1/E1/J1 voice connections 12 and T1/E1/J1 data connections 13. In an alternative embodiment (not shown), T1/E1/J1 data connections 13 (the out-of-band signaling channel) may connect directly to SS7 I/O cards 340.

Figure 3:
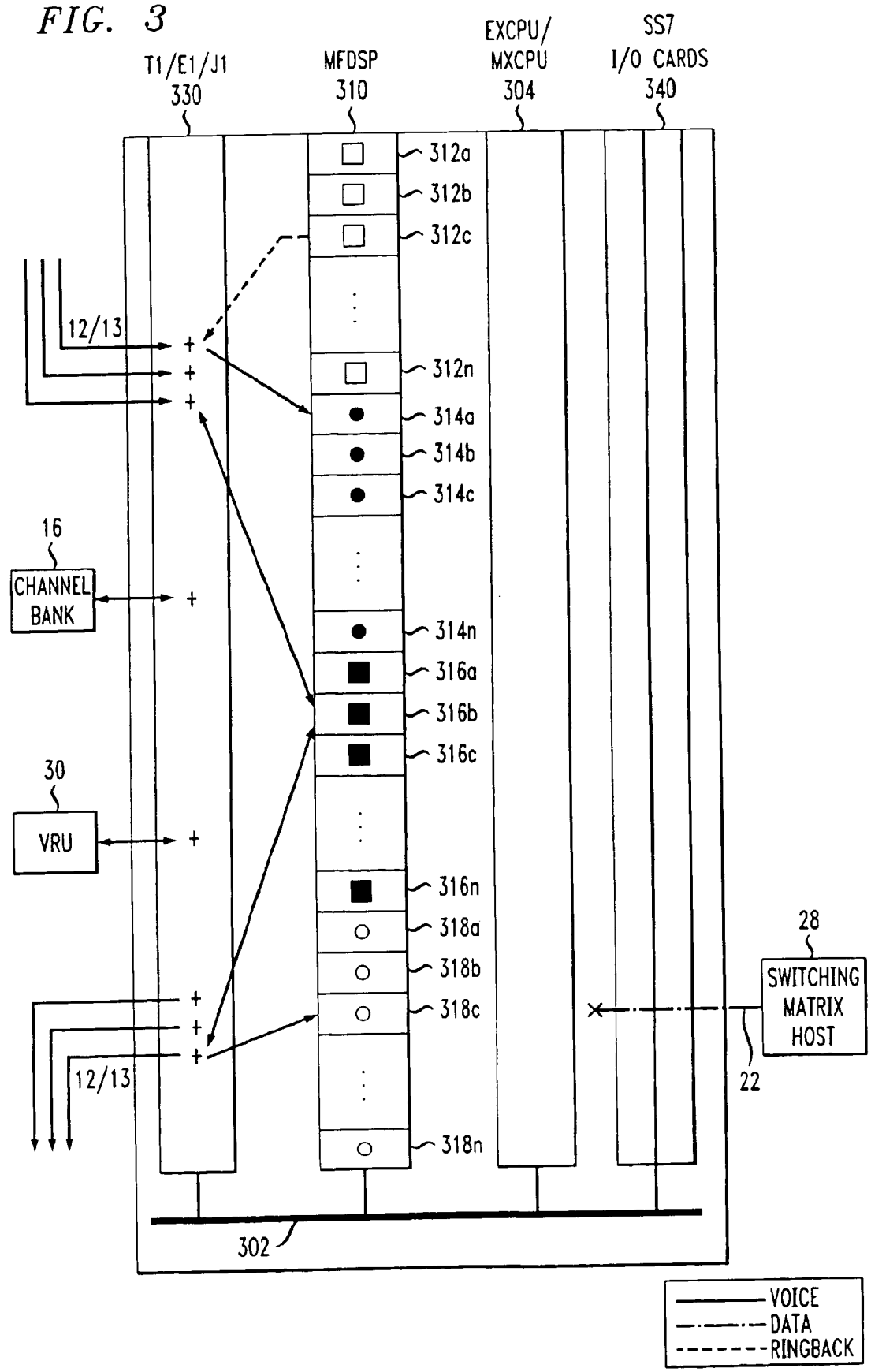
FIG. 3 provides a detailed view of a switching matrix platform used in one embodiment of the invention.

In FIG. 3, T1/E1/J1 interface 330 dedicates twelve channels on each of six of the eight spans to incoming calls and the other twelve to outgoing calls. The seventh T1/E1/J1 span serves as the T1 link between VRU 30 and switching matrix platform 14, and the eighth functions as a T1 link to channel bank 16 and operator telephone 18. The link between switching matrix platform 14 and VRU 30 is used to connect calling customers to a voice server, while the link between switching matrix platform 14 and operator telephone 18 is used to connect calling customers to a live operator.

A similar switching matrix platform to the one described herein is described in copending application Ser. No. 08/816,921, also assigned to the present assignee, the contents of which are herein incorporated by reference. It will be recognized by one skilled in the art that a variety of types of, or even multiple instances of, switching matrix platform 14 may be incorporated into a telephone network or directory assistance center 10 without exceeding the scope of this invention.

Switching matrix platform 14's operation is governed by instructions stored in switching matrix host computer 28. Switching matrix host computer 28 stores and executes computer-readable instructions for the purposes of, among others, configuring and operating switching matrix platform 14 and directing the transfer of calls through the switching matrix platform. The instructions implement the processes hereafter described, as well as provide full SS7 functionality. In alternative embodiments, the instructions may support any other appropriate type of out-of-band signaling protocol. The switching matrix host also directs the playback of recorded messages to callers connected to the directory assistance center. Pre-recorded greeting and closing messages played for callers are recorded in the voice of the operator to whom the caller will be, or was, connected. Switching matrix host 28 directs the playback of the appropriate message by identifying the voice connection 12 the caller is connected to and specifying the message to be played.

Further, switching matrix host 28 maintains call data for each directory assistance call connected to directory assistance system 10. The call data stored on the host computer consists of the most recent assistance request received from each caller, and includes one or more of: the calling telephone number, the date and time of the caller's connection to directory assistance center 10, the T1/E1/J1 span and channel the caller is connected to, the caller's desired destination telephone number, the status of the caller's previous directory assistance request, which operator assisted the caller, etc. Additional call data is stored on database server 26, as described below. The call data stored on switching matrix host 28 and database server 26 are provided to directory assistance providers when a caller makes multiple directory assistance requests in one call to directory assistance center 10. By considering the collected call data, such as the information that was provided to a caller in a previous request, a directory assistance provider can tailor subsequent assistance to be more effective.

Switching matrix host 28 also directs the transfer of information between itself and database server 26 (via data network 24), as well as between switching matrix platform 14 and database server 26, operator telephone 18, and channel bank 16. Although the switching matrix host 28 and database server 26 are depicted as distinct devices in FIG. 2, in an alternative embodiment they are both found in the same physical device. Furthermore, although one primary database server 26 is pictured, one of skill in the art will appreciate that multiple database servers may be beneficial and hence utilized instead.

Incoming calls received by switching matrix platform 14 are connected to an available operator via a T1 span 32 that is connected through channel bank 16 to an operator's telephone headset. If no operator is available when a call is received, the call is queued until an operator becomes available. In one embodiment, the queuing and call distribution is Automatic Call Distribution (ACD), but one of skill in the art will also appreciate that another method of call distribution based on a different priority scheme could be utilized as well.

Database server 26 provides operators with the means to search for a customer's desired party, and determine the appropriate telephone number. In one embodiment, the database provides the capability to search not just by name and address, but also by type of goods/services and/or geographical region, or by any other attribute in the customer record, including phone number. (E.g. the preferred database can answer queries soliciting the names/numbers of shops carrying model rocketry supplies in southeast Portland, Oreg., or of Chinese restaurants on a given street.) Data indexed in this fashion is usually not commercially available, so the present assignee starts with a commercially available database file (e.g. the Directory Assistance Database Source available from U.S. West), and enriches it by adding further data manually.

Desirably, the results of the database search presented on operator's terminal 20 are not alphabetized prior to display, but rather are presented in the order located by the database search engine. (If desired, a deliberate randomization of order could be effected before display). Businesses at the beginning of the alphabet are thereby not unduly favored by customers using the directory assistance service.

The database software itself is conventional. The presently preferred best mode is to use a database such as dB-One, a proprietary system available from the present assignee.

In another embodiment, database server 26 further includes a preferred service associated with each customer, or, in the absence of a specified preferred service, a default service. Examples of preferred services would include such features as returning to an operator, conferencing, re-attempting to establish a telephonic connection, creating a voice mail to be delivered at a later time, etc. The directory assistance center utilizes the preferred service associated with each customer by performing the appropriate service upon issuance of a command by the customer to do so. The customer is thus able to obtain, at the issuance of single command, the service he or she values most or uses most often, unique to that customer.

Voice response unit (VRU) 30 is incorporated into the system to play the constantly repeated parts of an operator's speech, namely the various greetings and signoffs (or closings), and the caller's desired telephone number where requested. Not only does this system provide a voice-saving and monotony-relief function for the operators, it performs a "branding" function (i.e. the pre-recorded messages incorporate the name of the telephone company through which the customer was routed to the directory assistance service), and it also reduces the amount of time an operator is actually connected to a customer. The VRU may also contain a voice recognition system for receiving verbal input from a party connected to the VRU.

Figure 4:
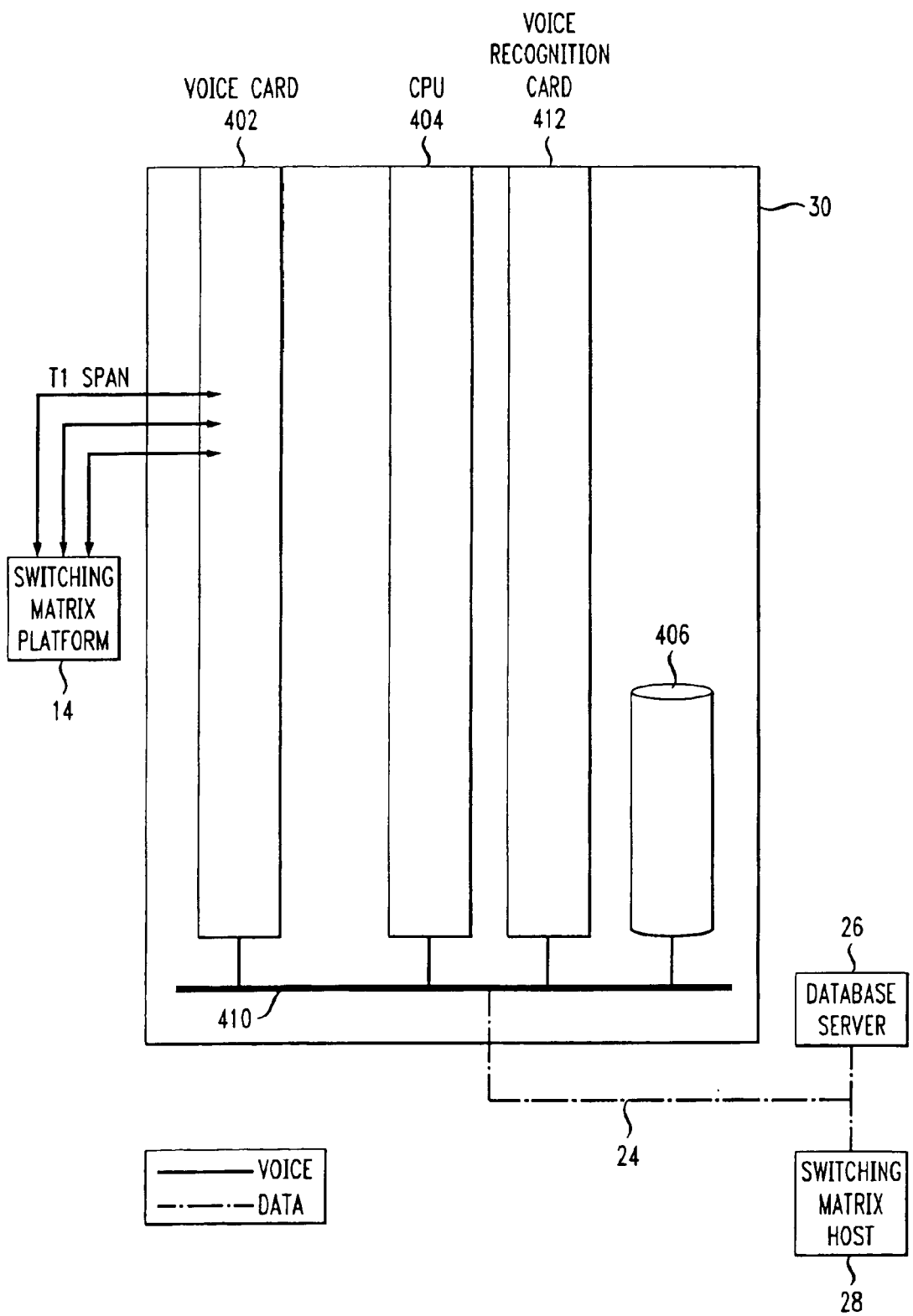
FIG. 4 provides a detailed view of a voice server used in one embodiment of the invention.

In an illustrative embodiment in FIG. 4, VRU 30 is connected via the data network 24 to database server 26, switching matrix host 28 (to which it acts as a slave processor) and switching matrix platform 14 via one or more T1 spans. Each VRU, when more than one is employed in directory assistance center 10, connect to switching matrix platform 14 via a separate voice server link. VRU 30 consists of a general purpose computer plus one or more voice cards (a first voice card 402 is depicted in FIG. 4), which serve as the interface between VRU 30 and the T1 span to switching matrix platform 14. Voice card 402 monitors and controls communications over the T1 span; its capabilities include telephone tone detection and generation, voice recording and playback, and call progress analysis. Therefore, very similar to switching matrix platform 14, VRU 30 is capable of detecting connection status conditions, detecting customer keypresses, and generating tones. Although FIG. 2 depicts VRU 30 distinct from database server 26, in alternative embodiments they are coterminous.

VRU 30 also includes typical computer components such as central processing unit 404, data storage unit 406, and bus 410 for transferring voice and data signals. VRU 30 also contains a voice recognition card 412 for receiving verbal input from a party connected to the voice server.

At appropriate stages in a call progression, switching matrix host 28 initiates a voice path between the VRU and the switching matrix platform such that the caller, or the caller and the operator, are able to hear whatever pre-recorded speech is played on that circuit by the VRU. Switching matrix host 28 then instructs the VRU, via data network 24, what type of message to play, passing data parameters that enable the VRU to locate the message appropriate to the call state, the service-providing telephone company, and the operator. The recording density used is high enough to provide a good enough quality of message playback that most users of the system should be unaware they are listening to a recording.

Method of Operation

Customers of a particular telephone company simply dial the access digits established for directory assistance by that company. Examples of typical access digits are "411," "*555," "555-1212" and "NPA-555-1212."

The participating telephone company's own switching system will then reroute the call to directory assistance service center 10 (via a T1/E1/J1 channel), where it appears as an incoming call. In a SS7 network, the telephone company or wireless carrier transmits call set-up information associated with the call from the telephone company's network node to the directory assistance center node (also via a T1/E1/J1 channel). For purposes of illustration, a SS7 call initiation procedure will be described, which is utilized not only in routing a customer's call to the directory assistance center, but also by the directory assistance center in connecting the calling customer to the desired number.

Figure 1C:
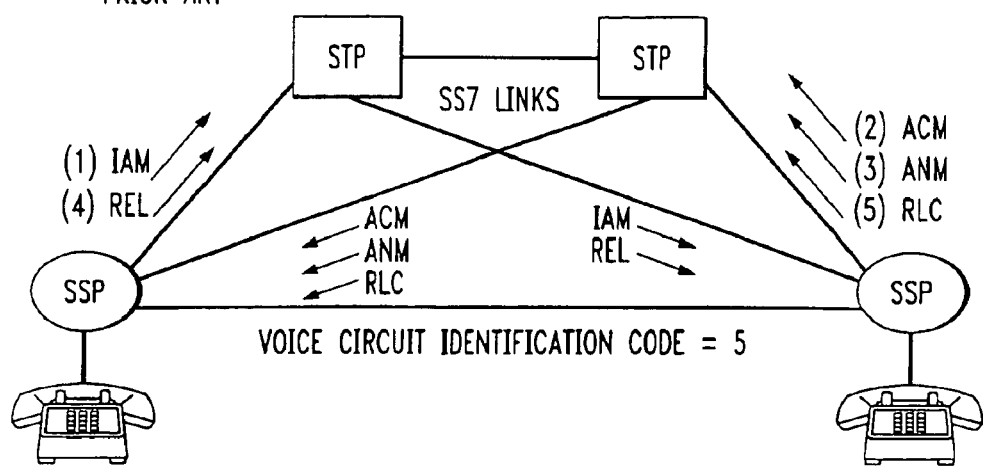
FIG. 1c is a block diagram depicting call setup and initialization in a prior art SS7 network.

As shown in FIG. 1c, the phone company (as the originating SSM here) first transmits an Initial Address Message (IAM) to reserve an idle voice trunk circuit from the originating switch to the destination switch (in the present instance, the destination switch would be switching matrix platform 14). The destination switch examines the dialed number, determines that it serves the called party and that the line is available for ringing. The destination switch then transmits an Address Complete Message (ACM) to the originating switch to indicate that the remote end of the voice trunk has been reserved. The destination switch rings the called party line and sends a ringing tone over the voice trunk to the originating switch. When the originating switch receives the ACM, it connects the calling party's line to the voice trunk to complete the voice circuit from the calling party to the called party. The calling party hears the ringing tone on the voice trunk. When the called party picks up the phone, the destination switch terminates the ringing tone and transmits an Answer Message (ANM) to the originating switch. The originating switch then verifies that the calling party's line is connected to the reserved voice trunk and, if so, initiates billing.

During the course of the call, if the calling party hangs up first, the originating switch sends a Release Message (REL) to release the voice trunk circuit between the switches. Upon receiving the REL, the destination switch disconnects the voice trunk from the called party's line, sets the voice trunk state to idle, and transmits a Release Complete Message (RLC) to the originating switch to acknowledge the remote end of the voice trunk circuit. When the originating switch receives the RLC, it terminates the billing cycle and sets the voice trunk state to idle in preparation for the next call. On the other hand, if the called party hangs up first, or if the line is busy, the destination switch sends a REL to the originating switch indicating the release cause, such as a normal release or busy condition. When the originating switch generates the RLC, it terminates the billing cycle and sets the voice trunk to idle.

Once the SS7 call initiation procedure is complete, and a customer's call has been "answered" by directory assistance center 10, Automatic Call Distribution (ACD) logic is used to queue (if necessary) and distribute the call to an operator in the order in which it was received, and such that the call traffic is distributed evenly among the operators. In other embodiments, other distribution logic schemes are utilized, such as Skills-Based Routing or a priority scheme for preferred customers. The queue is maintained by switching matrix host 28.

When a call is connected to an operator, switching matrix host 28 directs VRU 30 (also conferenced into the call) to play a greeting message, using a message pre-recorded by the connected operator. Both the operator and the calling customer hear the message, which incorporates the name of the service or company to which the customer is a subscriber (in other words, the call is "branded"). The message ends with a prompt, thus cuing the customer to volunteer what information they are seeking.

When the automated greeting is complete, the VRU is disconnected, and the operator and the customer are left connected by a 2-way speech path. From this point, the caller is interacting with a live operator.

In the event that the VRU is non-functional (for whatever reason), the incoming call is connected to the operator and a short trill, or "zip" tone is played to indicate that a caller is on the line. (Note that, in one embodiment, once operators are logged in to the system, they wear headsets and have their telephones 18 permanently off-hook. Their telephones do not ring when a call is presented.) The operator then speaks a greeting and prompt in real time, instead of the VRU playing a message.

If the caller requests information concerning, for example, local theater performances, the operator speaks a response based on hard copy information or information contained in database 26 of such events, maintained by the directory assistance center. At this point, the caller will be released from the call, and the operator becomes available to handle further calls.

If the caller is seeking directory assistance, the operator will engage in live dialogue to establish the name and other pertinent information of the wanted party, and then initiate a database search using operator terminal 20 and associated database server 26. In the event of an unsuccessful search, the operator will use alternative sources, such as the Electronic White Pages (EWP) or even printed directories. If requested, the operator can provide the address information of the destination party in addition to, or in lieu of, initiating a telephonic connection to the destination party.

The operator can connect the caller to the wanted party's number using one of two possible methods of call transfer: Blind Transfer or Hotline Transfer.

In either case, the call transfer is invoked by sending a sequence of digits (that includes the wanted party's number) to switching matrix host 28. The conventional method of doing this is simply dialing the digits on the operator's telephone handset (having first depressed the "flash" key to obtain dial tone). This method is always available. A much quicker and more accurate call completion method is generally preferred: the operator highlights the desired database entry on the screen of the terminal 20, and then initiates Blind or Hotline transfer to that number by entering a few keystrokes on the terminal keyboard. In this case, database server 26 transmits the same digit sequence as part of a message to switching matrix host 28, via data network 24.

More specifically, in the automated call completion method, the operator locates the desired listing in the database, and presses the "enter" key at operator terminal 20 to select the listing. Whereupon, operator terminal 20 displays a main call completion menu along with a selected listing. One example of such a menu is as follows:

| Main Call Completion Menu |
|---|
| 1) Blind Transfer with Return Transfer |
| 2) Blind Transfer with NO Return Transfer |
| 3) Hotline Transfer with Return Transfer |
| 4) Hotline Transfer with NO Return Transfer |
| 5) Supervisor |
| 6) Manual Dial |
| 7) No connect |

Options (1) and (2) of the main call completion menu initiate the "Blind Transfer" to the selected listing as described more fully below. Options (3) and (4) initiate the "Hotline Transfer" described more fully below. In the case of options (1) or (3), the return transfer operation which is described more fully below is enabled during the call. In the case of options (2) or (4), the return transfer or transfer back operation is disabled as also discussed more fully below. Option (5) is selected by the operator to summon the operator's supervisor for assistance handling the call. Option (6) overrides automated dialing of the selected listing, and allows the operator to manually dial a number at operator terminal 20. Option (7) cancels call completion.

When the operator selects option (6), the operator terminal 20 displays a call completion sub-menu such as follows:

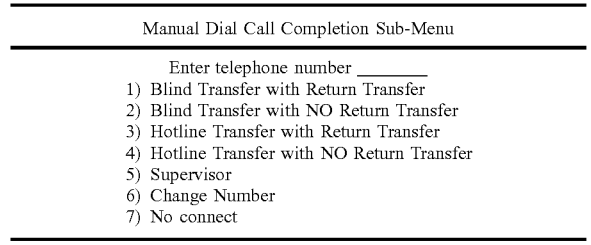

Manual Dial Call Completion Sub-Menu

Figure 5:
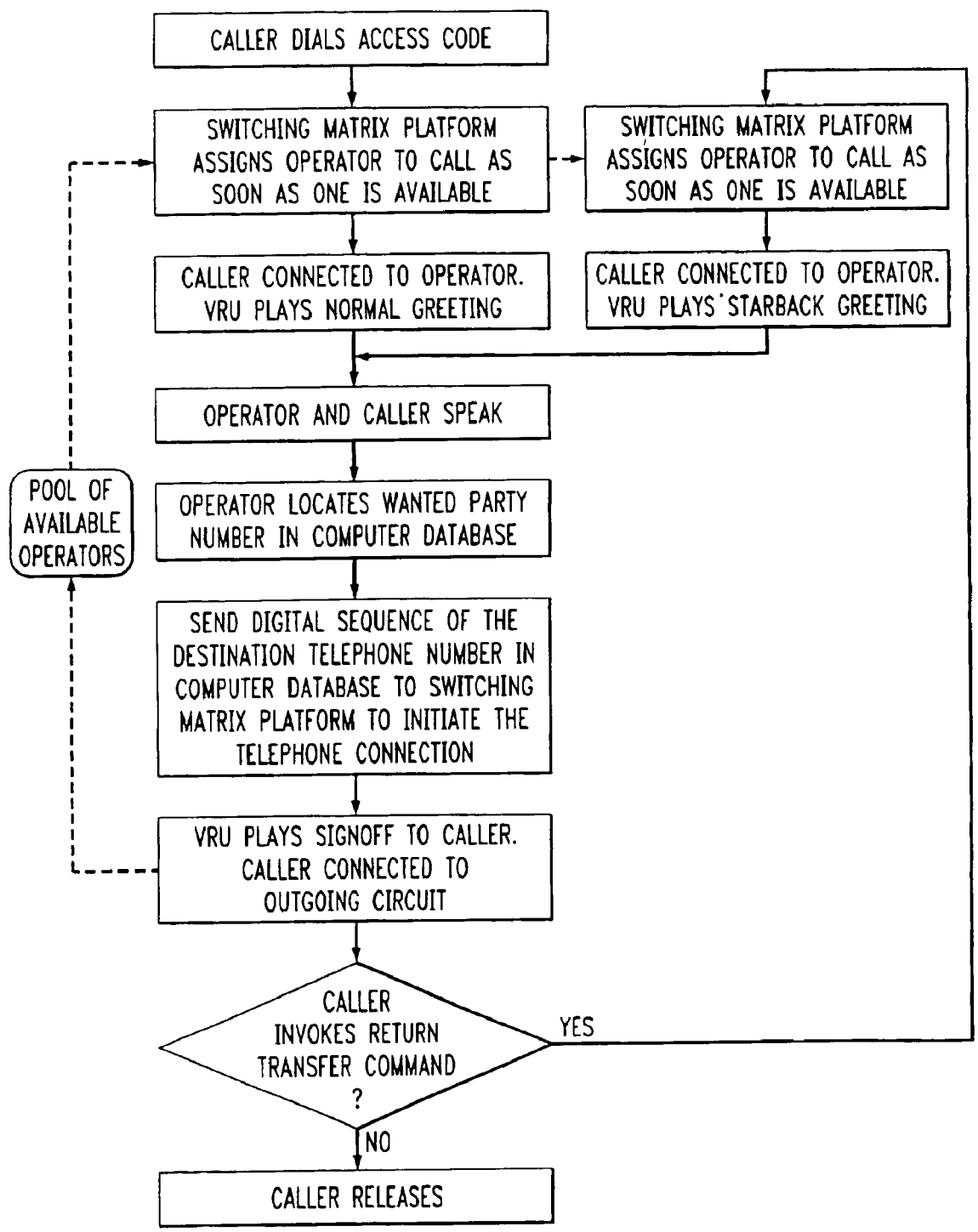
FIG. 5 is a flow chart depicting the process of sending a data packet to the switching matrix host in accordance with one embodiment of the present invention.

Enter telephone number _____
1) Blind Transfer with Return Transfer
2) Blind Transfer with NO Return Transfer
3) Hotline Transfer with Return Transfer
4) Hotline Transfer with NO Return Transfer
5) Supervisor
6) Change Number
7) No connect Upon selection of any of the connection options (1)–(4) of either the main call completion menu or manual dial call completion submenu, database server 26 sends a data packet to switching matrix host 28, via data network 24. The data packet contains the appropriate station ID and the digit sequence of the selected listing or manually entered telephone number in the case of option (6). A flow chart illustrating the process of sending a data packet to the switching matrix host is provided in FIG. 5.

"Blind Transfer" is the normal means by which an operator establishes a connection between the caller and the wanted party's number. As soon as switching matrix host 28 receives the Blind Transfer command (whether from database server 26 or an operator's telephone set 18), an attempt is made to establish a route out of switching matrix platform 14 to the destination carrier's switching center, which may be either the caller's carrier switching center 34 or may be a separate network's carrier switching center.

In a SS7 network, this procedure occurs through transmission of an Initial Address Message (IAM) by the directory assistance node, a reply Address Complete Message (ACM) by the destination carrier's SS7 network node, and an Answer Message (ANM) from the directory assistance node if the call is successful. In this context, because a telephonic connection to the directory assistance center has already been established from the perspective of the caller's carrier switch, the directory assistance switch acts as an independent originating switch. For example, if the destination carrier's network node sends a Release Message (REL) to the directory assistance node because the line is busy, the directory assistance node does not transmit the REL down the signaling line to the caller's carrier network node because the telephonic connection to the directory assistance center is still necessary if the caller wishes to accomplish a return transfer.

During the pendency of this process, the operator is released from the call and made available to receive further calls. If VRU 30 is operational, it is commanded to play a signoff message (pre-recorded by the just-released operator). If the VRU is not available, the operator speaks the signoff message before initiating the transfer. The VRU status is known by whether the call was initiated by a VRU-played greeting, or by zip tone. Failed routing attempts cause reorder tones to be returned to the operator's handset, or an error indication to be returned to database server 26 (depending on how the switching matrix host received the transfer command).

In one embodiment of the present invention utilizing SS7 technology, the call set-up procedure determines whether the desired party's line is busy nearly instantaneously (by sending out an Initial Address Message), even before the VRU plays a signoff message. If the desired party's line is busy, the VRU plays a message informing the customer that the desired number is busy, and providing the customer with a menu of options, including returning to an operator or a recitation of the desired phone number. While this message is being played, the directory assistance node re-queries the destination carrier's network node by resending another IAM message. If the directory assistance system determines the destination number is no longer busy, the present message ceases to play and the VRU instead informs the caller that the desired number is no longer busy, and commences once again with the signoff message.

Figure 6:
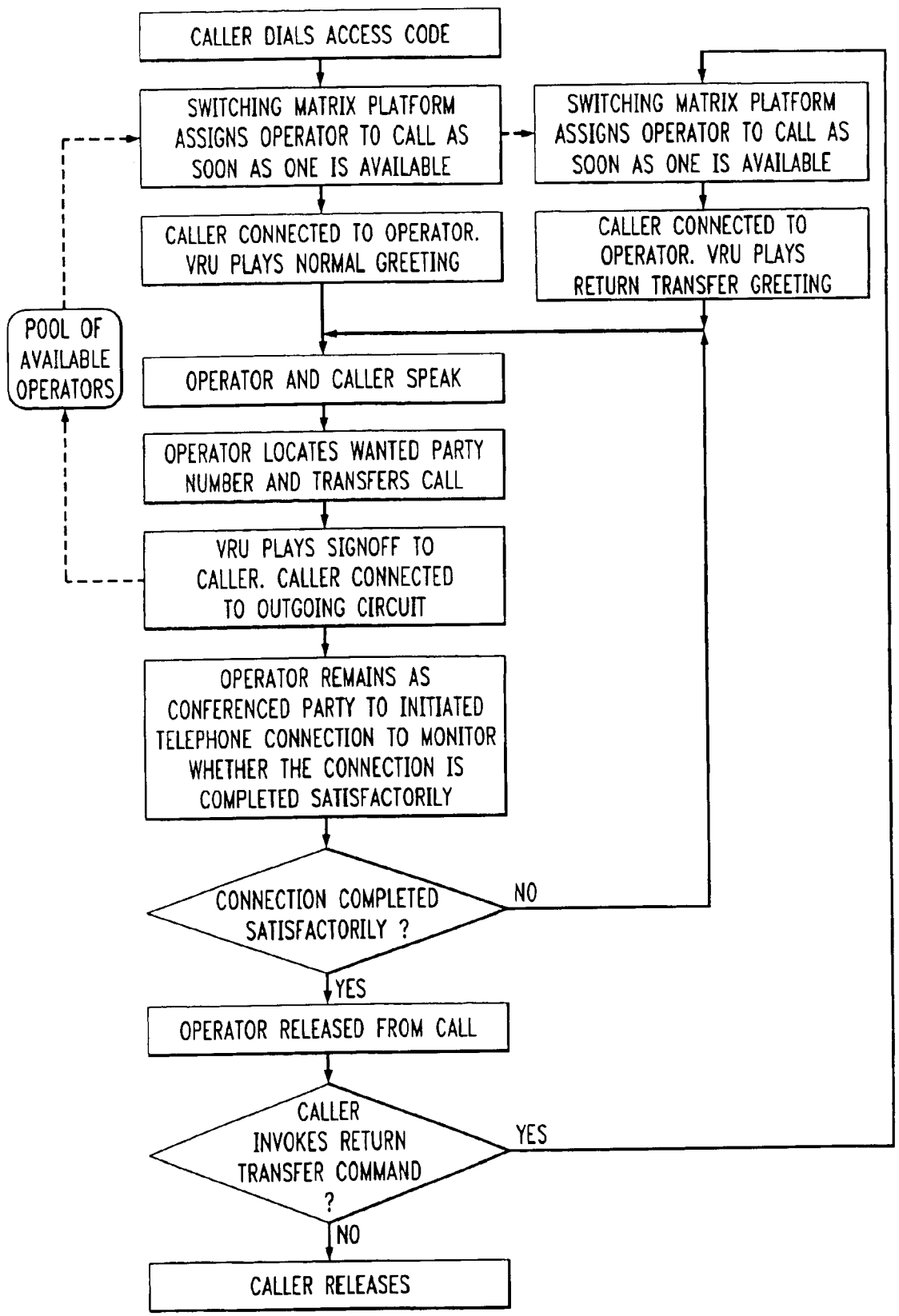
FIG. 6 is a flow chart depicting the process of maintaining the directory assistance operator as a conferenced party to the initiated telephonic connection in accordance with one embodiment of the present invention.

Like Blind Transfer, the "Hotline Transfer" method of establishing a connection between the caller and the wanted party's number can be initiated by the operator from either telephone handset 18 or from data terminal keyboard 20. The difference is that the operator is not automatically released from the call in a Hotline Transfer. Instead, he/she is conferenced into the call by switching matrix host 28 using SS7 call processing and is able to monitor its progress. Using either the telephone handset or the data terminal keyboard, the operator may withdraw from the call after verifying its establishment, or may cause the called circuit to be released through SS7 processing and then re-engage in dialogue with the caller. A flow chart illustrating the process of a Hotline Transfer is provided in FIG. 6. Hotline Transfers are used when a caller requests that the operator "stay on the line."

If, after initiation of a transfer (whether or not it succeeds), and at any time before the caller hangs up, the caller requires further operator assistance, the caller can perform a return transfer back to an operator (hereafter referred to as "return transfer" or "transfer back"). This is done simply by pressing the "*" (star) key or another designated key on the caller's telephone once or twice (depending on the system, and as instructed by the operator in the signoff message). Generation and detection of the customer-issued return transfer command can occur through DTMF tones or through SS7 signaling messages. The underlying call transport system is a SS7 network.

In one embodiment of the present invention, the return transfer function is implemented when an appropriate SS7 signaling message is detected at the directory assistance node. One of the functions of SS7 messaging in a SS7 network is to provide call control signaling. Call control signaling includes, for example, a data message from the carrier SS7 network node indicating that one of the parties to the call has pushed a particular key, such as the "*" key or even a dedicated, specialized key (e.g. a "return to operator" key). An example of a SS7 return transfer signaling message is described in further detail below.

Phone companies and wireless carriers can use equipment at their switching centers to detect DTMF tones from the voice channel and convert them to out-of-bands signal to be sent down the signaling channel. Wireless carriers, and in particular digital networks, may not even need to convert customer key presses from analog DTMF tones to digital SS7 messages as the wireless stations may receive key presses in digital format to begin with. Phone companies and wireless carriers may also utilize phones that directly link to the out-of-band signaling network, whereby the press of certain keys (such as a "return to operator" key) will directly generate appropriate out-of-band signals. Voice recognition technology in a customer's phone or at a carrier's switch can also be used to detect a spoken customer command (e.g. "please return me to an operator"), in response to which an appropriate out-of-band signal would be generated correspondingly.

Figure 7:
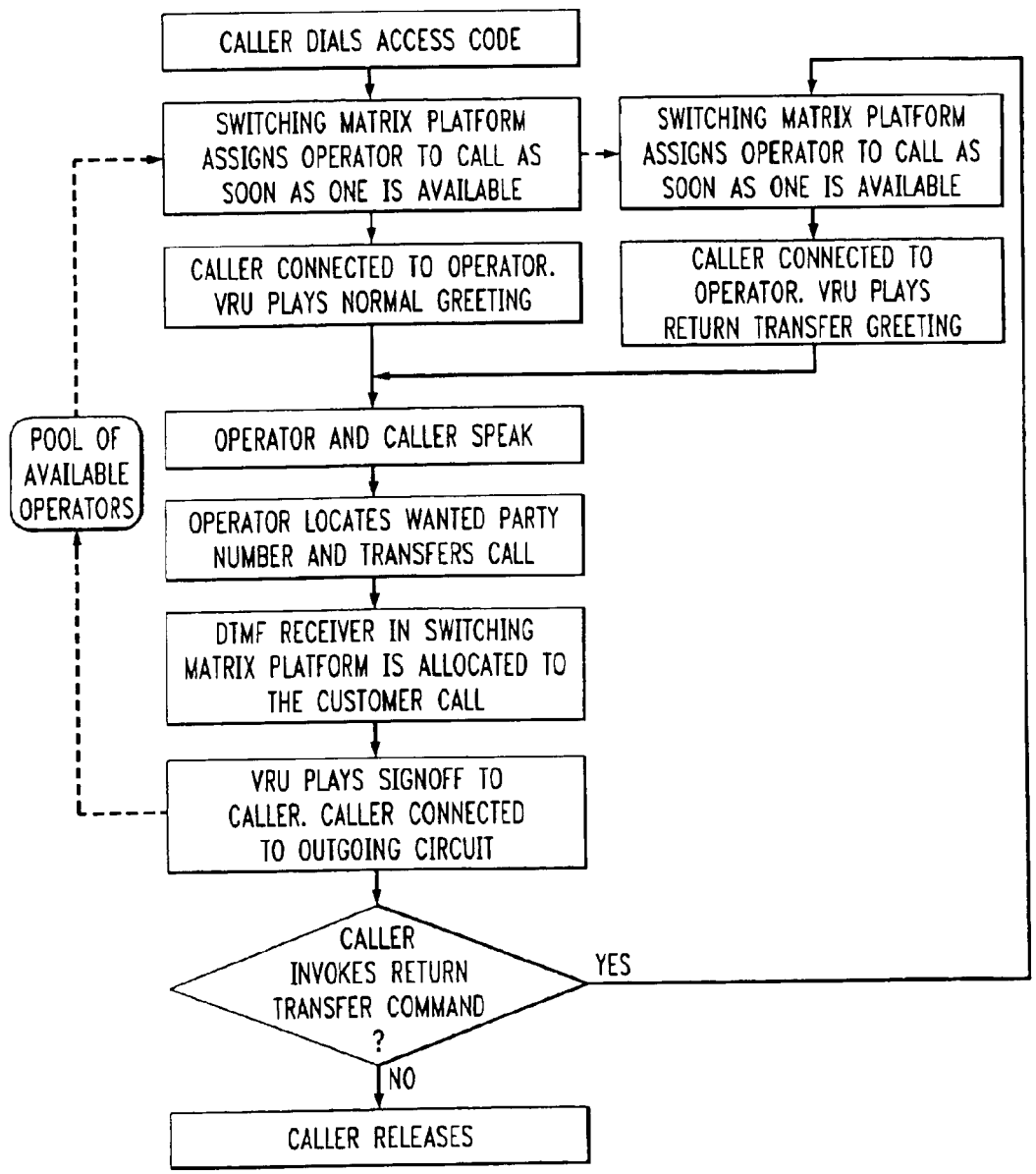
FIG. 7 is a flow chart depicting the process of allocating a DTMF receiver in the telephone switch to a customer call for the entire duration of the call in accordance with one embodiment of the present invention.

In another embodiment, the star or other designated key tone(s) is detected by a DTMF receiver at the directory assistance center (allocated in switching matrix platform 14 for the entire duration of the call), while the underlying call transport system utilizes a SS7 network. Thus, call set-up, monitoring and tear-down occurs via out-of-band signaling messages, while a DTMF receiver allocated to the voice channel monitors for a return transfer command. A flow chart illustrating the process of allocating a DTMF receiver in the telephone switch to a customer call for the entire duration of the call is provided in FIG. 7.

To avoid duplicative DTMF and SS7 return transfer command detection, in one embodiment the directory assistance center stores information for each carrier/phone company customer in database server 26, indicating whether that customer provides SS7 messaging for return transfers and other commands. If the carrier or phone company does provide out-of-band signaling for the "*" or other command key, the directory assistance center will not allocate a DTMF receiver for a call received from that company's switching center. Advantageously, detection resources are thereby preserved and duplicative command detection avoided.

Regardless of which form of return transfer command detection is used, once the DTMF receiver or directory assistance node detects the issuance of the return transfer command by the caller, a SS7 Release Message is sent from the directory assistance node to the destination party's carrier network node. In response, the destination party's carrier network node issues a Release Complete Message, which, after being received by the directory assistance node, results in the state of the corresponding voice connection 12 being set to idle in preparation for the next call.

After the connection to the destination party is released, switching matrix host 28 causes the customer call itself to appear as a fresh call to the ACD logic or other distribution scheme being utilized. This in turn results in the caller being connected to an available operator, whereupon switching matrix host 28 instructs the connected VRU 30 to play the appropriate pre-recorded greeting message with return transfer instructions. Note that if ACD is the operative distribution scheme, the operator to whom the call is connected may or may not be the same operator that previously handled this call. In one embodiment of the present invention, the call is flagged as a priority call when re-inserted into the queue, and hence is directed to an available operator sooner than other non-return transfer calls. In an alternative embodiment, the caller is always connected to the same operator who previously handled the call, taking priority over other non-return transfer queued calls for that operator.

The "return transfer" feature enables callers who have been transferred by means of a Blind Transfer to recall an operator if the transfer does not complete satisfactorily. It also enables a caller to request a follow-on call at the completion of a successfully completed call without incurring the delay or difficulty of re-dialing into the system.

It will be recognized that the desired number need not be voiced to the customer unless explicitly requested. Sometimes a customer uses the return transfer feature to request that the number be voiced if, for example, he or she finds a follow-up call is necessary later.

The return transfer technique enables the cost-effective provision of many services not previously available. For example, a directory assistance center may offer mapping/locator services which provide spoken directions to guide vehicle-based customers from their present location to a desired destination. However, to obviate the need for the customer to write the directions down while in the vehicle, the operator should be available to issue instructions along the course of the vehicle's route. By using the return transfer feature, the customer can receive initial instructions, and thereafter summon further instructions as needed along the route simply by pressing the star or other designated key. In such a system, the customer's connection to the directory assistance center is maintained during the course of the trip, but the operator can attend to other customers while the traveling customer doesn't need the operator's immediate attention. (Since a return transfer may return the customer to a different operator, provision is made for transferring—with the customer—a pointer to the particular database record (i.e. map or directions) being utilized by that customer, and a pointer to a current location within that record. By this arrangement, a different operator who is summoned for assistance using the return transfer feature can pick up where the last operator left off.) While driving between operator instructions, the customer is simply kept in a "hold" state.

Sometimes the customer will be connected to a destination telephone number that makes its own use of "*" or other designated key tone. For example, some automated order entry systems require the caller to press the "*" key to signal the end of an entry, etc. Others require the caller to press the "*" key to access certain information.

Figure 8:
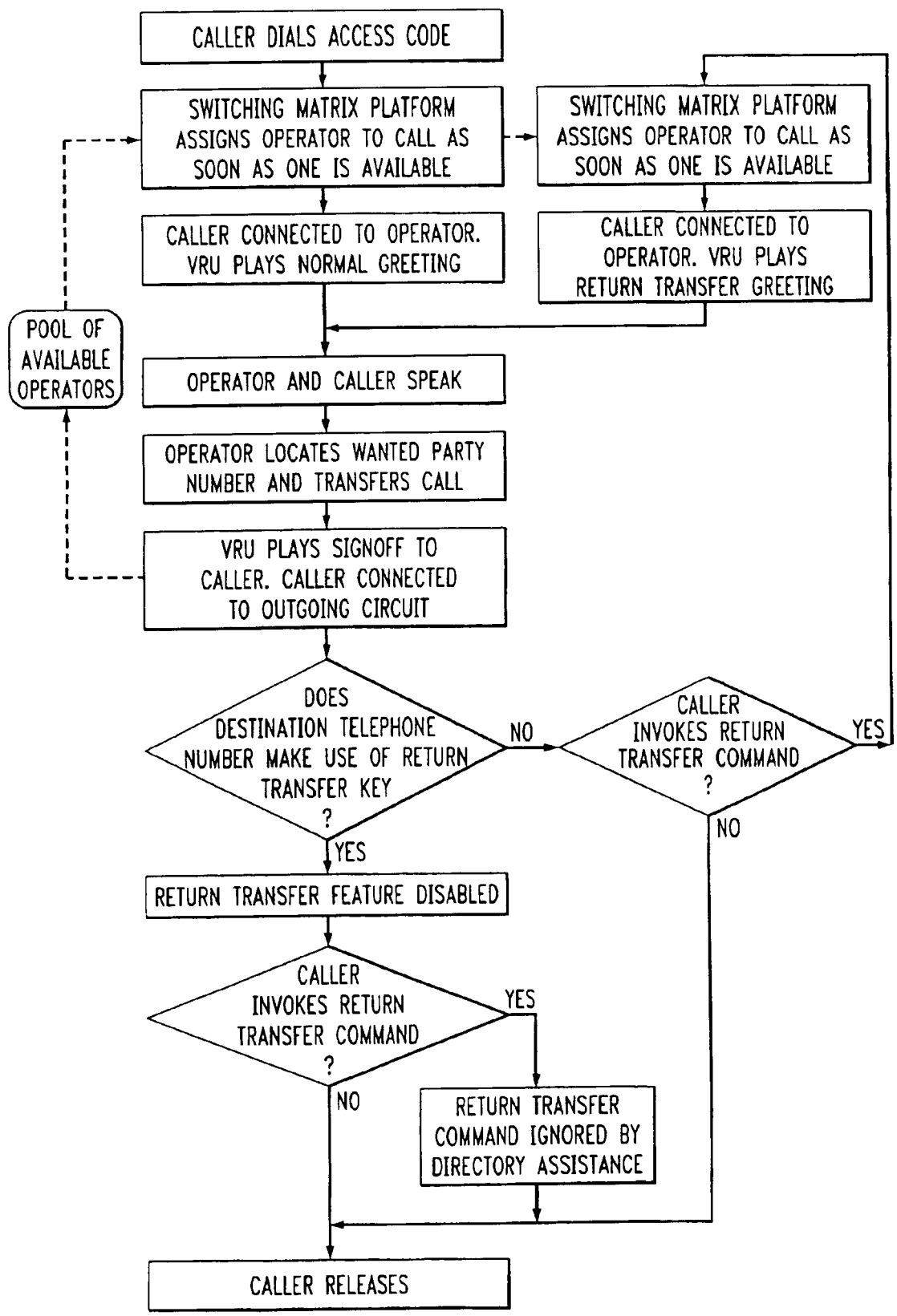
FIG. 8 is a flow chart depicting the process of disabling tone triggered return transfer in accordance with one embodiment of the present invention.

To accommodate such possibilities, one embodiment of the present invention stores data in database 26 to indicate which destination numbers make their own use of the "*" key or other transfer back designated key or key series. If the customer is connected to such a destination telephone, the return transfer SS7 message or DTMF tone detection is disabled. Alternatively, a destination telephone may send this information directly to the directory assistance center during call initiation via an SS7 message. A flow chart illustrating the process of disabling the return transfer feature is provided in FIG. 8. If the user presses the "*" key while connected to such a destination number, it is ignored by directory assistance center 10. But, when the customer thereafter calls another destination telephone number that is not so listed in the database, the return transfer feature is once again available.

Sometimes database 26 may not contain complete information identifying destination numbers that make their own use of the "*" key. Moreover, some directory assistance systems may not track this data at all. In such circumstances, the directory assistance center 10 desirably includes provision to manually disable the return transfer SS7 message or DTMF tone detection. This disabling can be done by operating a switch at the operator's console, by entering a command on the operator's keyboard, or by activating an icon on the operator's terminal 20.

Such a manual disabling of the return transfer SS7 message or DTMF tone detection can occur, for example, when a caller is inadvertently transferred back to the operator by using the "*" key to access a service at the destination number. The caller can note the problem to the operator, who can disable the feature and reconnect the caller to the destination number. In other situations, the caller may know in advance that the destination number makes use of the "*" key (e.g. for electronic banking), and can request that the operator disable the return transfer SS7 message or DTMF tone detection before the connection is first made.

Another option is to allow enabling or de-enabling of the return transfer feature to be particular to the customer, as opposed to the destination telephone number. In this scenario, database server 26 would store information personalized to each calling customer, identifying whether the customer prefers to have the return transfer feature on or off. When an incoming call is received, switching matrix host 28 can identify the calling customer through the associated SS7 call initiation messages (such as the customer's Automatic Number Identification, or ANI), do a look-up in database server 26 as to the return transfer feature preference of the customer, and then either enable or de-enable the return transfer SS7 message or DTMF tone detection as appropriate. The preference for each customer for various features can be obtained from the customer directly (either through a live operator or an automated query), or through the customer's carrier provider. The carrier provider can collect this information from, for example, a query on a customer's bill.

Another call feature available to the caller after completion of a telephonic connection to the desired party, and at any time before the caller or called party hangs up, is a conferencing feature. This feature, like a return transfer, is initiated by the customer by pressing a specific key such as the "#" key or another designated key on the caller's telephone once or twice (depending on the system, and as instructed by the operator in the signoff message). Detection of the conferencing command, like a return transfer command, can occur through an SS7 signaling message transmitted to the directory assistance node or through allocation of a DTMF receiver for the call in the switching matrix platform.

In either case, after the directory assistance center detects a command for conferencing, the additional destination number must be ascertained. In one embodiment, this occurs by switching matrix platform 14 conferencing an operator into the existing call using SS7 processing. The operator will then prompt the customer for either the telephone number of the additional party if known, or if unknown, the operator will engage in dialogue to establish the name and other pertinent information of the wanted party and then initiate a database search. Once the additional destination number is determined, the operator can either perform a Blind or Hotline transfer, just as with the initiation of the original call. The outgoing call is placed to a third network switch, which may or may not be the same network switching center as the second (the called party's switch) or the first (the caller party's switch), depending on which carrier network the various parties use.

As with the telephonic connection to the original destination party, the initialization of the conferencing telephonic connection occurs via SS7 call set-up procedures, with switching matrix platform 14 operating as the originating switch. In a SS7 network, this procedure occurs through transmission of an Initial Address Message (IAM) from the directory assistance network node, a reply Address Complete Message (ACM) from the destination carrier's network node, and an Answer Message (ANM) back from the directory assistance network node if the call is successful. The attempted conferencing telephonic connection is bridged into the existing telephonic connection between the caller and the called party such that the parties can hear the ringing tones or busy signal.

In the event the call transfer occurs via Blind Transfer, and the connection cannot be established because of a ring-no-answer or busy condition, in one embodiment the switching matrix host will direct the VRU to announce that connection cannot be completed, and to present the caller with a menu of choices, including attempting to reestablish the connection, attempting to conference in a different party, returning to an operator or terminating the conference attempt. The directory assistance center then responds appropriately to the customer's selection. If the connection is successfully established, the conferencing connection is bridged into the existing telephonic connection.

In an alternative embodiment, an operator is not utilized to determine the telephone number of the additional desired party. Instead, the VRU prompts the caller to enter or speak the number for the party (this method only works if the calling customer actually knows the number for the additional party in advance). Thus, using SS7 message detection, DTMF tones or voice recognition capabilities, the switching matrix host ascertains the additional destination number from the caller's input.

In another embodiment of the present invention, after the directory assistance center detects a command for conferencing, the calling customer is offered a menu of choices for determining the telephone number of the additional desired party, including speaking to an operator or using an automated number entry system through the VRU.

At any time after the conferencing connection has been successfully established, the caller can again initiate a command for conferencing by pressing the "#" or other designated key. The procedure outlined above is repeated again, and if successful, a fourth party can be conferenced into the call. This process can be repeated up to the limitations of the switching matrix platform for bridging calls together.

Alternatively, the conferencing feature can be conducted via a "third-party calling" procedure. By this method, upon detection of the command for conferencing, the calling customer is disconnected from the telephonic connection to the destination party, including voice connection 12, without actually releasing the call. Instead, the calling customer is treated like a new, independent outgoing telephonic connection to be attempted. The customer hears a dial tone, as if the customer had just gone off-hook. After the customer places the call directly by dialing, SS7 call initiation procedures are used to attempt a conferencing telephonic connection. Upon a successful connection, the caller is able to "switch" (bridge) the conferencing connection over to the original connection by pressing a predetermined key or by briefly holding down the hang up switch. Alternatively, the switching matrix host, upon detection of a successful call completion on the independent voice line, can automatically bridge the two connections together.

Both the "return transfer" and "conferencing" features are initiated when the customer issues a command to do so, which in one embodiment would be through pressing the "*" or other designated key. One of skill in the art will appreciate that any numeric, alphanumeric or other dedicated key can also function as a command key. In alternative embodiments, the customer's actions can imply a command (e.g. if told that the call will be returned to an operator unless the customer presses "*", and the caller does not press "*"), or voice recognition technology in a customer's phone or at a carrier's switch can be used to detect a spoken customer command (e.g. "please return me to an operator").

In one embodiment, instead of having multiple keys each represent different optional commands, the directory assistance center stores a preferred feature or service associated with each customer in database server 26. When a transfer by the operator is made to initiate the desired telephonic connection, and database server 26 sends switching matrix host 28 the destination telephone number and station ID, it also includes the customer's preferred service. If the database server does not have a preferred service for the customer in its data, it sends a default service, such as a return transfer function. Examples of preferred services include conferencing, re-attempting to establish a telephonic connection (i.e. reinitiating the SS7 call initiation procedure), creating a voice mail to be delivered at a later time, etc.

When the customer initiates a command for the preferred service by pressing a universal command key, such as the "*" key, and upon SS7 message or DTMF tone detection of the same, the switching matrix host executes the appropriate preferred function. In this manner, the caller obtains customization of the enhanced directory assistance features to his or her personal preference. To initially establish a calling customer's preferred service, the operator can query a customer who lacks a specified preferred service, and manually input the answer into database server 26. Alternatively, the selection of the preferred service can occur automatically through a menu of options presented to the customer by the VRU, or from the customer's phone company/carrier, which can obtain the information via account setup or survey and provide this information to the directory assistance center.

Thus far, customer-initiated return transfer, conferencing and preferred service features have been described. It will be appreciated, however, that any feature can be linked to a customer initiated command. In one embodiment, if the customer presses a command key, such as the "*" key, which is then detected via SS7 signaling or a DTMF receiver, the VRU presents the caller with a menu of service options. Examples of potential service options might include returning to an operator, re-attempting to establish a connection to the destination telephone number, conferencing, reciting the destination telephone number, sending an alphanumeric page of the destination telephone number, or resuming the telephonic connection in progress. The user is then prompted to enter a selection, either by pressing the appropriate key (i.e. "press '1' to return to an operator, '2' to re-attempt the call," etc.) or by speaking the selection (using the voice recognition capabilities of the VRU). Advantageously, automating the customer-initiated features cuts down on the time that a live operator needs to speak with a customer. If, for example, a destination number is busy but the caller wishes to retry the connection, using an automated menu allows the caller to self-select the re-attempt instead of requiring an operator.

One advantage of using a SS7 network is that discrete, nearly instantaneous signaling messages are transmitted from the destination party's carrier network node to the directory assistance node indicating the status of the telephonic connection. Examples of SS7 call control messages include: call-could-not-be-completed, number-is-disconnected, busy signal, network communication problem, or caller or called party hang-up.

In one embodiment of the present invention, the switching matrix host can execute a predetermined service feature in response to SS7 call control signaling, as detected at the directory assistance node. For example, the caller can automatically be returned to an operator every time that a signaling event indicative of a problem, or a hang-up by caller or called party, is encountered. In routing the call back to an operator, the caller can be put into a ACD queue or given priority to reconnect to the original operator the customer was transacting with. When an appropriate operator receives the call at an operator station, the operator sees on operator terminal 20 the signaling event encountered (sent by the switching matrix host) and can thus discuss the situation with the caller and the available options. This approach ensures that a wide range of communication events can be dealt with by a universal automatic response (return to operator), as a human operator can provide the widest range of assistance in the highest number of contexts.

In an alternative embodiment, switching matrix host 28 directs VRU 30 to play a message corresponding to the signaling event encountered, explaining to the caller the signaling event that has occurred (e.g. that the line is busy). The VRU then presents the caller with an appropriate audio menu offering several directory assistance options. The caller chooses one by pressing the specified key, for example, the "1" key to have the VRU recite the dialed telephone number, the "2" key to transfer the called to a live operator, the "3" key to record a message for later delivery to the destination party, the "4" key to re-attempt to initiate the call, or the "5" key to receive the destination telephone number via the caller's alphanumeric page or telephone. The caller chooses a selection by entering the appropriate key, or alternatively by speaking a selection which the VRU's voice recognition capabilities detect and identify.

The menu presented to the caller is tailored to the signaling event encountered. Thus, the several illustrative options presented above are responsive to a busy signal from the destination telephone number. If the signaling event were a network condition affecting outgoing calls, for example, the user would not be presented with the option to attempt to reestablish the connection.

The automatic service response to a signaling event that has been described is particularly advantageous to wireless and PCS phone customers. The automatic return to operator or automatic voice response menu ensures that a customer never has to hang up and redial the directory assistance center to obtain continued or additional directory assistance services. The termination of the call occurs wholly at the customer's selection by either hanging up, or by choosing a voice menu selection for ending the call. The customer is left with the impression that the directory assistance center is dedicated to reaching the end result desired by the customer.

SS7 Signaling Messages

As is well known in the art, an SS7 signaling message typically contains a variable numbers of octets (i.e. eight-bit bytes) of information, with the front-end octets typically being reserved for standardized service, routing and range and status data. Additional octets may contain a variety of communication and processing-oriented data. For purposes of illustration, an example of an SS7 message conveying a customer request for a return transfer will be described herein.

In one example of an SS7 return transfer message, data for a set of "optional parameters" and a series of sets of "sub-optional parameters" are set forth after the service, routing and range and status data. The optional parameters set includes a first octet setting forth the total number of octets in the optional parameters set (which in the present example would be four), a second octet setting forth the device type from which the return transfer command originated, a third octet setting forth the capabilities of the device and a fourth octet setting forth the number of sub-optional parameters data sets. The device type octet specifies whether the originating device is, for example, a PDA (personal digital assistant), a PC, a phone, a wireless phone, a web-enabled phone, etc. (also known as a device characteristic).

The device capabilities octet specifies the possible communication mediums of the device, such as voice, video, graphical, or text. If the device capabilities octet indicates graphics or text capabilities, the same octet would also indicate the language or representation scheme of the text/graphics (also known as a device characteristic), such as HTML (Hypertext Markup Language), ASCII (American Standard Code for Information Exchange), XML (Extensible Markup Language) or WML (Wireless Markup Language). Additionally, the device capabilities octet specifies the protocols supported by the device, such as HTTP (Hypertext Transfer Protocol), WAP (Wireless Application Protocol), UDP (User Datagram Protocol) or TCP (Transaction Control Protocol).

The final optional parameter octet sets forth the number of sub-optional parameter sets. Each sub-optional parameter set has a first octet setting forth the total number of octets in that particular sub-optional parameter set (which in the present example would be four), a second octet indicating the sub-optional parameter type (e.g. action, data, or class of service), a third octet containing a data type for the sub-optional parameter set (e.g. command, digits, or text) and a fourth octet containing appropriate data.

For an "action" sub-optional parameter type, the data type indicated in the third octet would be "command," and the actual data in the fourth octet would indicate that the customer has pressed, for example, the star or other specialized key which is recognized as a command for a return transfer function.

For a "class of service" sub-optional parameter type, the data type indicated in the third octet would be "digits" (and indicated as BCD, hexadecimal, binary, etc.) or "text", and the actual data would set forth such status items as whether the customer was authorized to connect to an operator, whether long distance is permitted, the language of the customer, the priority level of the customer, etc. These customer-specific features are also known as customer service parameters.

For a "data" sub-optional parameter type, the data type indicated in the third octet would be "digits" or "text," and the actual data would set forth phone numbers, network addresses, physical locations, PIM account indications, etc.

In one embodiment of the present invention, a SS7 return transfer message includes two sub-optional parameter sets (and hence the last parameter of the optional parameters set would be two). The first sub-optional parameter set is an "action" sub-optional parameter type with a "command" data type and data specifying a request for a return transfer. The second sub-optional parameter set is a "class of service" sub-optional parameter type with a "digits" data type and data specifying whether the customer is allowed to make return transfer requests, whether the customer is a priority or preferred customer and the language of the customer caller. After the last sub-optional parameter set, a checksum value is appended to the SS7 message for accuracy and error-checking.

As is true with all SS7 messaging, an acknowledgment message is sent to the originator of a command for service. Thus, in one embodiment of the present invention, after the directory assistance center receives an SS7 return transfer command message, it sends an acknowledgment SS7 message which substantially mirrors in form the incoming SS7 return transfer message. For the optional parameter device type, the acknowledgment message will indicate, for example, a positive acknowledgment, an invalid device or an invalid device for the particular customer. For the optional parameter device capabilities, the acknowledgment message will indicate, for example, a positive acknowledgment, an invalid capability for the device specified, communication medium disallowed for user, service unavailable temporarily, service unavailable in this area or service unavailable permanently.

For acknowledgment of the sub-optional parameter sets, if the sub-optional parameter type is action, the acknowledgment message will indicate, for example, a positive acknowledgment, unable to complete action, invalid action, invalid action for the user, invalid action for the service type or invalid parameters supplied for the action. If the sub-optional parameter type is class of service, the acknowledgment message will indicate, for example, a positive acknowledgment, unable to provide class of service, invalid class of service for device type or invalid parameters provided for class of service. If the sub-optional parameter type is data, the acknowledgment message will indicate, for example, a positive acknowledgment, invalid data for data type specified, invalid data for device type or invalid data for capabilities.

Billing Issues

Although these can be varied, there are three billing components of a typically wireless phone originated call to a directory assistance service according to the present invention:

1) "Air time," or the total time the caller uses the wireless carrier's wireless radio system to carry a call from his/her wireless telephone. This is the responsibility of the wireless carrier.

2) The per-call charge levied for use of the directory assistance service. This charge is made by the directory assistance service to the wireless carrier on the basis of the number of calls received from the carrier in a particular time period.

3) Toll charge—the charge levied by a carrier for the duration of an answered connection over a toll route originated by a directory assistance operator. This charge is levied by the carrier used for completion of customer calls originated by the directory assistance operator. The wireless carrier is dependent on the directory assistance service to provide enough details of these calls to enable it to accurately bill its subscribers accordingly, if desired. There are two ways of doing this:

A) The directory assistance service provides "tickets" of all calls that were transferred and answered. The precise content and format of the ticket is customer-defined, but includes at least the following information: calling number, called number, date and time of connection (i.e. when answer indication was received), duration of call and trunk group identification numbers. The ticket files can be transferred on magnetic tape or by means of electronic file transfer.

B) If the call to the destination party is being placed on the same wireless network as that used by the calling customer, the wireless network can use its own switching equipment to generate the required tickets. The digits that are dialed by the directory assistance service's switching matrix platform to initiate the call transfer (via the wireless carrier's network) can incorporate the calling party number (Automatic Number Identification, or ANI). The wireless carrier's own switching equipment then has all the information needed to generate the required tickets. In a SS7 environment, the relevant information is contained in the signaling data transmitted during the call-initiation process, and easily stored for use in tickets.

It is the wireless carrier's responsibility to rate the calls and determine what charge is to be levied.

Having described the principles of our invention with reference to various embodiment and certain variations thereon, it should be apparent that these examples can be modified in arrangement and detail without departing from such principles. For example, while the invention has been illustrated with reference to a system in which a "return transfer" customer is either routed back to the next available operator or routed back to the original operator, in other embodiments, provision can be made for giving the customer a choice: pressing one key for the first available operator, and another key to be inserted in the original operator's queue.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method for providing a directory assistance service comprising:

receiving a call from a caller desiring a telephone number;

connecting the call to a directory assistance service provider;

receiving information from the caller over a voice connection;

determining a desired telephone number based on the received information;

connecting the call from the caller to the desired telephone number without requiring the caller to dial the desired telephone number;

monitoring the call connected to the desired telephone number for a message for connecting the caller back to the directory assistance service provider; and reconnecting the caller to the directory assistance service provider when the message is detected, wherein the message traverses a second connection different from the voice connection.

2. The method of claim 1 wherein the message is initiated from the caller's telephone.

3. The method of claim 1 wherein the message is initiated when the caller presses one or more predetermined keys on the caller's telephone.

4. The method of claim 1 wherein the second connection includes an SS7 signaling connection.

5. The method of claim 4 wherein the message includes an SS7 signaling message.

6. The method of claim 1 wherein the second connection includes a data connection.

7. The method of claim 1 wherein the directory assistance service provider includes at least one operator.

8. The method of claim 1 wherein the directory assistance service provider includes at least one automated voice unit.

9. A method for providing a directory assistance service comprising:
receiving a call, from a caller, over a network including at least a voice connection, and a second connection for communicating messages to administer the call;
directing the call to a directory assistance service provider;
transferring the call to a destination communication device in response to a request communicated by the caller through the voice connection;
monitoring the call transferred to the destination communication device for a message from the second connection, the message being initiated by the caller; and
directing the call to the directory assistance service provider after a detection of the message.

10. The method of claim 9 wherein the destination communication device comprises a telephone.

11. The method of claim 9 wherein the message is initiated by the caller using a telephone.

12. The method of claim 11 wherein the message is initiated when the caller presses one or more predetermined keys on the telephone.

13. The method of claim 9 wherein the second connection includes an SS7 signaling connection.

14. The method of claim 13 wherein the message includes an SS7 signaling message.

15. The method of claim 9 wherein the second connection includes a data connection.

16. The method of claim 9 wherein the directory assistance service provider includes at least one operator.

17. The method of claim 9 wherein the directory assistance service provider includes at least one automated voice unit.

18. A system for providing a directory assistance service comprising:
an interface for receiving a call from a caller desiring a telephone number, information being received from the caller over a voice connection;
a device for connecting the call to a directory assistance service provider;
a server for determining a desired telephone number based on the received information;
a mechanism for connecting the call from the caller to the desired telephone number without requiring the caller to dial the desired telephone number; and
a processor for monitoring the call connected to the desired telephone number for a message for connecting the caller back to the directory assistance service provider, the caller being reconnected to the directory assistance service provider when the message is detected, wherein the message traverses a second connection different from the voice connection.

19. The system of claim 18 wherein the message is initiated from the caller's telephone.

20. The system of claim 18 wherein the message is initiated when the caller presses one or more predetermined keys on the caller's telephone.

21. The system of claim 18 wherein the second connection includes an SS7 signaling connection.

22. The system of claim 21 wherein the message includes an SS7 signaling message.

23. The system of claim 18 wherein the second connection includes a data connection.

24. The system of claim 18 wherein the directory assistance service provider includes at least one operator.

25. The system of claim 18 wherein the directory assistance service provider includes at least one automated voice unit.

26. A system for providing a directory assistance service comprising:
an interface for receiving a call, from a caller, over a network including at least a voice connection, and a second connection for communicating messages to administer the call;
a mechanism for directing the call to a directory assistance service provider, the call being transferred to a destination communication device in response to a request communicated by the caller through the voice connection; and
a processor for monitoring the call transferred to the destination communication device for a message from the second connection, the message being initiated by the caller, the call being directed to the directory assistance service provider after a detection of the message.

27. The system of claim 26 wherein the destination communication device comprises a telephone.

28. The system of claim 26 wherein the message is initiated by the caller using a telephone.

29. The system of claim 28 wherein the message is initiated when the caller presses one or more predetermined keys on the telephone.

30. The system of claim 26 wherein the second connection includes an SS7 signaling connection.

31. The system of claim 30 wherein the message includes an SS7 signaling message.

32. The system of claim 26 wherein the second connection includes a data connection.

33. The system of claim 26 wherein the directory assistance service provider includes at least one operator.

34. The system of claim 26 wherein the directory assistance service provider includes at least one automated voice unit.

35. A method for providing a directory assistance service comprising:
receiving, from a caller, a call in which the caller communicates a directory assistance request to a directory assistance provider;
searching for contact information in response to the directory assistance request;
based on the contact information, establishing communications between the caller and a called party;
monitoring a first information channel for a predetermined indication initiated by the caller at least after the communications between the caller and the called party are established; and
establishing a second information channel through which the caller is able to communicate with a directory assistance provider when the predetermined indication is detected, the first information channel being different from the second information channel.

36. The method of claim 35 wherein the predetermined indication is initiated from the caller's telephone.

37. The method of claim 36 wherein the predetermined indication is initiated when the caller presses one or more predetermined keys on the caller's telephone.

38. The method of claim 35 wherein the first information channel comprises an SS7 signaling channel.

39. The method of claim 38 wherein the predetermined indication comprises an SS7 signaling message.

40. The method of claim 35 wherein the directory assistance service provider includes at least one operator.

41. The method of claim 35 wherein the directory assistance service provider includes at least one automated voice unit.

42. A system for providing a directory assistance service comprising:

an interface for receiving, from a caller, a call in which the caller communicates a directory assistance request to a directory assistance provider;

a server for searching for contact information in response to the directory assistance request;

a mechanism for establishing communications between the caller and a called party based on the contact information; and a processor for monitoring a first information channel for a predetermined indication initiated by the caller at least after the communications between the caller and the called party are established, a second information channel being established through which the caller is able to communicate with a directory assistance provider when the predetermined indication is detected, the first information channel being different from the second information channel.

43. The system of claim 42 wherein the predetermined indication is initiated from the caller's telephone.

44. The system of claim 43 wherein the predetermined indication is initiated when the caller presses one or more predetermined keys on the caller's telephone.

45. The system of claim 42 wherein the first information channel comprises an SS7 signaling channel.

46. The system of claim 45 wherein the predetermined indication comprises an SS7 signaling message.

47. The system of claim 42 wherein the directory assistance service provider includes at least one operator.

48. The system of claim 42 wherein the directory assistance service provider includes at least one automated voice unit.

* * * * *